United States Patent [19]

Vines et al.

[11] Patent Number: 5,006,841
[45] Date of Patent: Apr. 9, 1991

[54] ADDRESSABLE TRANSDUCER WITH IMPROVED RESPONSE SIGNAL PROCESSING

[75] Inventors: Arthur D. Vines; Frederick A. Schonfeld; Ricardo Espat, all of Albuquerque, N. Mex.

[73] Assignee: Sparton Corporation, Jackson, Mich.

[21] Appl. No.: 156,487

[22] Filed: Feb. 16, 1988

[51] Int. Cl.⁵ .............................................. H04Q 9/00
[52] U.S. Cl. ........................ 340/825.07; 340/870.21; 340/870.23
[58] Field of Search ................ 340/870.21, 870.26, 340/870.23, 825.07; 331/51; 307/271; 328/30; 455/112

[56] References Cited

U.S. PATENT DOCUMENTS

| | | | |
|---|---|---|---|
| 3,932,704 | 1/1976 | Bodony | 375/65 |
| 3,982,199 | 9/1976 | Green | 331/51 |
| 4,160,121 | 7/1979 | Kaufman | 375/65 |
| 4,238,783 | 12/1980 | Miller | 340/870.26 |
| 4,349,821 | 9/1982 | Vancsa | 340/870.21 |
| 4,399,440 | 8/1983 | Douglas | 340/870.26 |
| 4,428,073 | 1/1984 | Verburgt | 340/870.26 |
| 4,628,315 | 12/1986 | Douglas | 340/870.26 |

Primary Examiner—Donald J. Yusko
Assistant Examiner—Edwin C. Holloway, III
Attorney, Agent, or Firm—Reising, Ethington, Barnard, Perry & Milton

[57] ABSTRACT

A plurality of addressable transducers at remote locations are connected to a home station by a pair of transmission lines which carry power as well as address signals to the transducers, and carry response signals from the transducers, when addressed, to the home station. Each transducer carries a decoder which is programmed to recognize a particular code, and a response circuit comprising a current sink oscillator to modulate the transmission line current at a frequency corresponding to the measured parameter. The response circuit operates on an analog voltage representing the measured condition by an A/D converter to generate a corresponding digital number, a clock provides a fixed frequency, and a divider divides the fixed frequency by the digital number to provide a resultant frequency, which in turn is divided by a flip-flop to yield a square wave output.

4 Claims, 3 Drawing Sheets

5,006,841

ADDRESSABLE TRANSDUCER WITH IMPROVED RESPONSE SIGNAL PROCESSING

FIELD OF THE INVENTION

This invention relates to an encoder for expressing a measured analog value as a frequency and particularly to such an encoder for the response circuitry of an addressable transducer.

BACKGROUND OF THE INVENTION

Monitoring systems for monitoring physical quantities or parameters are used in many applications such as manufacturing plants, chemical processing plants, pipe lines and telephone cables. The physical quantities monitored include fluid pressure in telephone cables. This application typically requires the use of transducers at monitoring points which may be located up to one hundred miles or so from the monitoring or central station. The wire size and the number of wires that can be economically used imposes limitations on the current and voltage that can be effectively used in the system. In this kind of application, it is desired to use a large number of transducers with a minimum of transmission lines and power requirements while realizing a high degree of accuracy and reliability in the acquisition of data representing the values of the monitored physical quantities.

The U.S. Pat. No. 4,628,315 to Douglas entitled "Addressable Transducer with Improved Address Signal processing" meets the requirements for such systems. It discloses a system that requires only two transmission lines and supports a large number of remote transducers. The transmission lines supply power to the transducers, send address signals to the transducers, and carry response signals from the transducers to a central station. The response signals are generated by a current sink oscillator which modulates transmission line current at a frequency corresponding to the measured parameter.

It has been found that an improved response circuitry can overcome limitations on the quality of the line current modulation to enhance accuracy of the transmitted information.

SUMMARY OF THE INVENTION

It is therefore an object of the invention to provide an addressable transducer with improved response signal processing. In particular it is an object to provide such a transducer with square wave current sink signals having a frequency or period accurately representative of the measured condition.

The invention is carried out in an addressable transducer by a response circuit for generating a signal corresponding to a measurand, comprising; measuring means for producing an analog voltage representing the measurand, an analog to digital converter responsive to the analog voltage for generating a digital number having a value representing the measured parameter, clock means for providing a fixed frequency, and a divider subject to the digital number for dividing the fixed frequency by the number to yield a resultant frequency corresponding to the value of the measurand.

BRIEF DESCRIPTION OF THE DRAWINGS

The above and other advantages of the invention will become more apparent from the following description taken in conjunction with the accompanying drawings wherein like references refer to like parts and wherein.

DESCRIPTION OF THE PREFERRED EMBODIMENT

Figure 1:
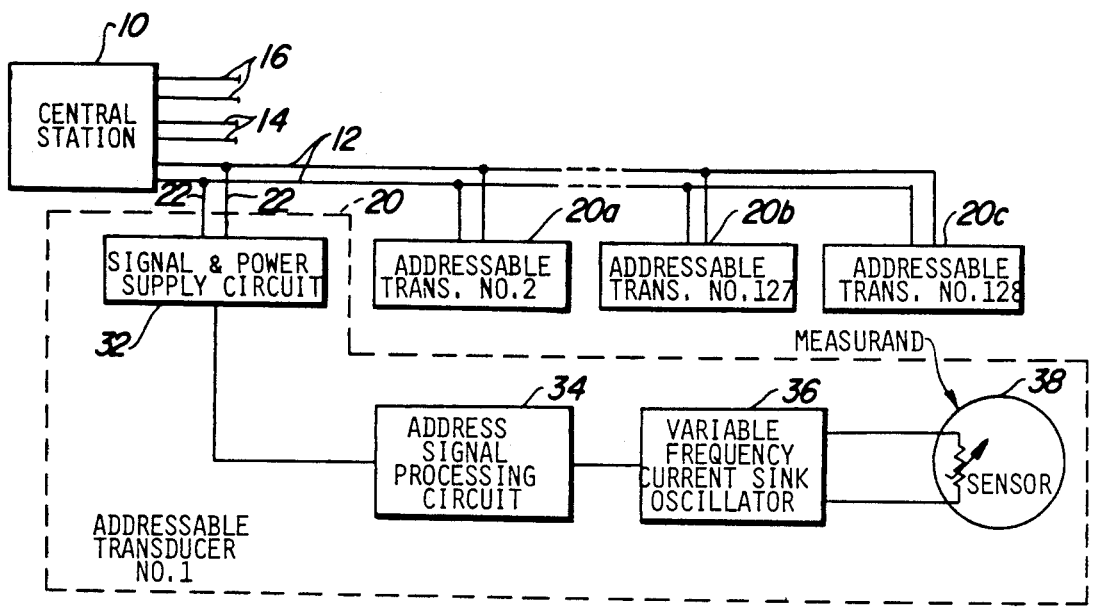
FIG. 1 is a block diagram showing addressable transducers in a prior art monitoring system.

The invention is an improvement on the transducer disclosed in the aforementioned U.S. Pat. No. 4,628,315 to Douglas which is incorporated herein by reference. That patent reveals some system details which are ancillary to the present invention and may be helpful to a complete understanding of the full system.

Referring to the drawings, there is shown an illustrative embodiment of the invention in an addressable transducer for use in a monitoring system which is adapted for monitoring values of physical conditions at a large number of locations some of which may be a long distance from the central station of the system. This embodiment is especially adapted for use in monitoring a telephone cable installation with multiple transducers being connected through the same pair of transmission lines to the central station. In particular, the individual transducers are selectively addressed by a pulse width modulated voltage applied to the pair of lines at the central station. The address signal is effective to interrogate that transducer having the transmitted address. The addressed transducer responds by producing current modulation in the lines at a frequency corresponding to the value of the physical condition being monitored. The frequency is measured at the central station as an indication of the value of the physical condition. It will be apparent as the description proceeds that the invention may be used in many different applications and it may be implemented in different ways.

As shown in FIG. 1, the monitoring system comprises a central station 10, such as a telephone cable maintenance center which is adapted to automatically monitor physical quantities, such as fluid pressure, at spaced points along a cable. For this purpose, a transmission line pair 12, sometimes known as a control pair, extend through the cable to reach the most remote point on the cable to be monitored. The transmission line pair 12 is connected with multiple addressable transducers such as transducers 20, 20a, 20b, and 20c, which in the illustrative embodiment number up to 128 and are located at monitoring points along the cable. The transducer 20 is connected with the transmission line pair by a pair of input/output terminals 22 and, similarly, all of the transducers are connected in parallel across the line pair.

The transducer 20 comprises, in general, a signal and power supply circuit 32, an address signal processing circuit 34 and a variable frequency current sink oscillator 36. When a transmitted address signal is the same as the assigned address, the oscillator 36 is turned on and oscillates at a frequency determined by a sensor 38 responsive to the value of the physical quantity being monitored. The oscillator 36 produces square wave current modulation of the line current in the transmission line pair 12. The frequency or preferably the period of the current modulation is measured at the central station 10.

Figure 2:
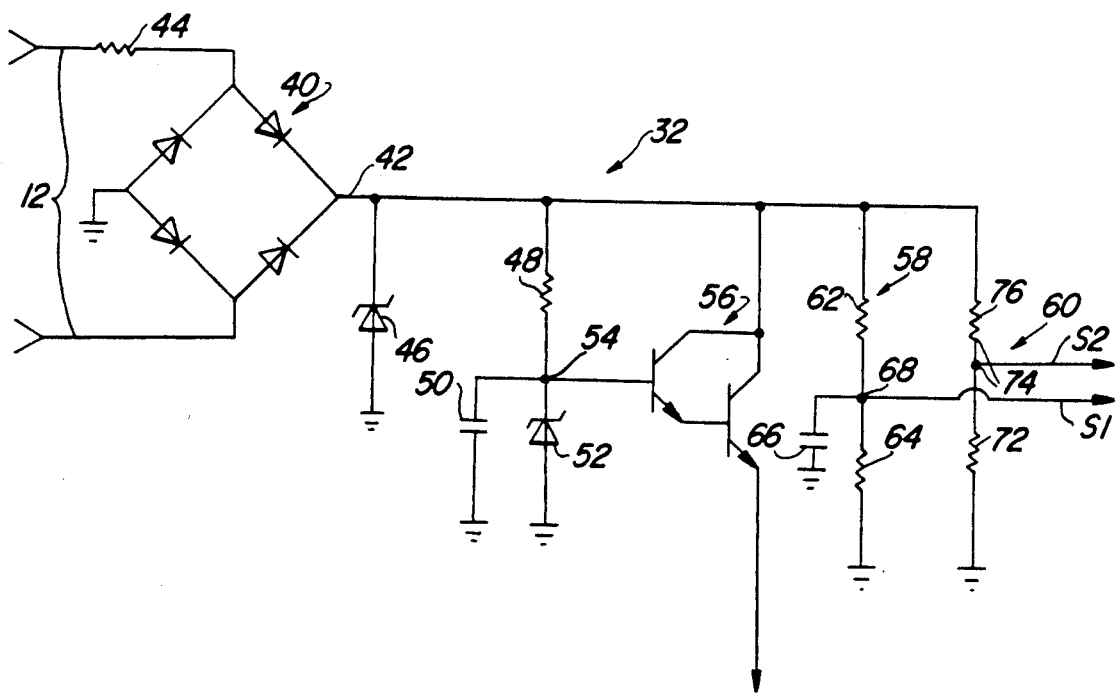
FIG. 2 is a schematic circuit diagram of the signal and power supply circuit of FIG. 1.

The signal and power supply circuit 32 is shown in FIG. 2. A diode bridge 40 couples the transmission pair 12 to the transducer and makes the circuit independent of pair polarity. The bridge output is grounded at one terminal while the other terminal 42 provides a positive output. A limiting resistor 44 at a bridge input and a zener diode 46 between the output terminal and ground protects the electronic assembly from voltage transients on the transmission pair 12. A voltage regulator section comprises a resistor 48 and a capacitor 50 serially connected between the terminal 42 and ground and a zener diode 52 across the capacitor provide a 6.8 volt reference at the junction 54 of the components. A Darlington pair 56 has a base connection at the junction 54 and a collector connection with the terminal 42 to provide a low impedance output source of about 5.6 volts DC to provide a voltage supply V+.

A pair of voltage dividers 58 and 60 form a discriminator which provides level shifting and data-from-power separation. Voltage divider 58 comprises resistors 62 and 64 connected between the terminal 42 and ground and a capacitor 66 connected between the resistor junction and ground. The junction 68 is an output terminal for a data reference signal S1. The voltage divider 60 comprises resistors 70 and 72 serially connected between the terminal 42 and ground. The resistor junction forms the data output terminal 74 for the data signal S2. The resistors are chosen to provide a nominally higher voltage level at terminal 74 as compared to terminal 68 during steady state conditions. Address signals, however, are amplitude and pulse width modulated pulses with a short pulse signifying a logic "0" and a long pulse signifying a logic "1". The voltage S1 at the terminal 68 will be held at an average DC value due to a long time constant provided by the capacitor 66. The voltage S2 at the terminal 74 however quickly follows the address pulse voltage wave form with the result that the terminal 74 voltage S2 swings above and below the terminal 68 voltage S1.

Figure 3:
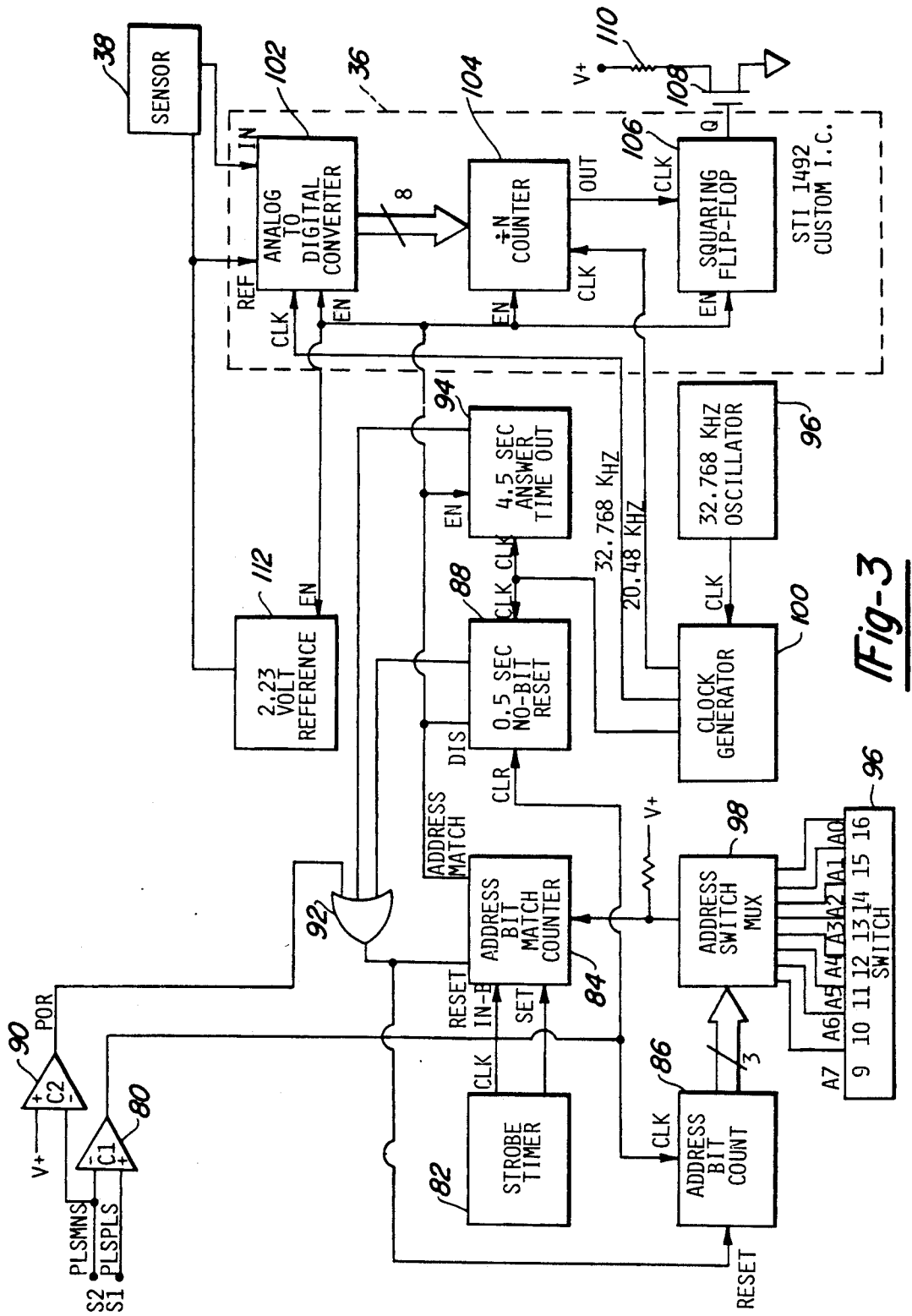
FIG. 3 is a block diagram of the address signal processing circuit and the variable frequency current sink oscillator of FIG. 1 according to the invention.

Referring to FIG. 3, the address signal processing circuit 34 includes a level detection comparator 80 having its output of address bits coupled to a strobe timer 82, an address bit match comparator 84, an address bit counter 86, and a reset circuit 88. A power on reset comparator 90 issues a signal when power is first applied and the signal is input to an OR gate 92. The reset circuit 88 also has an output connected to the input of the OR gate 92. Another reset circuit, the answer timeout circuit 94 has its output connected to the input of the OR gate 92. A crystal regulated oscillator 96 provides clock pulses to a clock generator 100 which issues clock pulses at various desired frequencies. One of those frequencies drives the reset circuits 88 and 94. If no address bit is received for a period of 0.5 seconds the reset circuit 88 issues a reset signal. The answer timeout circuit 94 issues a reset signal 4.5 seconds after an address match has been made. A DIP switch 96 comprising a gang of switches set with the address bits of the transducer is connected to the address switch multiplexer 98 which selectively outputs the switch code bits to the address bit match counter 84. The match counter 84 issues an enable pulse to the answer timeout circuit 94 and to the response circuit 36, to be described, and issues a disable command to the reset circuit 88.

The addressing process operates as follows. The signal S1 is applied to the positive input on the level detection comparator 80, the signal S2 is applied to the negative inputs of both comparators 80 and 90, and the V+ voltage is applied to the positive input of the power on reset comparator 90. When the transmission pair first has power applied, the signal S2 will appear immediately but the voltage V+ must slowly build up due to the time delay in the voltage regulator. Thus initially S2 will be larger than V+ causing the comparator 90 to issue a momentary reset signal to initialize the address bit counter 86 and the reset circuit 88. The level detection comparator 80 has an inverting action so that when the signal S2 is high the output will be low. Thus the comparator output is the complement of the signal voltage on the transmission pair.

The pulse code represents a 0 bit by a pulse 50 ms wide and a 1 bit by a pulse 100 mS wide. To discriminate between the different pulse widths a strobe timer 82 issues a strobe pulse 75 mS after the leading edge of each pulse. At that moment the pulse level is compared to the stored address bit to determine whether there is a match. The first pulse of a series of bits is fed to the strobe timer to start the timer and to the address bit match counter 84. The pulse is also fed to the address bit counter 86 which, in turn, signals the address switch MUX to advance the most significant bit stored in the switch 96 to the match counter 84 for comparison with the transmitted bit. When the strobe timer times out after 75 mS a strobe pulse is sent to the bit match counter 84 to enable the comparison function. If the transmitted pulse at that instant has the same logic level as the corresponding switch bit the match is counted. The reset circuit 88 is cleared as each new address pulse is received. Succeeding address pulses are compared to stored address bits in the same manner, the address bit counter 86 being incremented by one as each new transmitted pulse is received to cause the next most significant bit to be advanced from the address switch MUX 98 to the bit match counter. If eight matches are obtained, as reflected in the match count, a match signal is issued from the bit match counter 84. The match signal is effective to disable the 0.5 second no-bit reset circuit 88, enable the 4.5 second answer timeout circuit 94 and to enable the oscillator 36 of the response circuitry. If no match is obtained and the transmitted signal ends, the reset circuit 88 will, after 0.5 second effect reset of the address bit match counter 84 and the address bit counter 86.

The response circuit comprises the variable frequency current sink oscillator 36 and the sensor 38. The oscillator 36 includes an analog to digital converter 102, a divide-by-N counter 104 and a squaring flip-flop 106. Each of these components is enabled by a pulse from the bit match counter 84. The analog to digital converter 102 also receives a clock signal from the clock generator 100. The converter 102 receives an analog voltage signal from the sensor circuit in accordance with some condition being measured. That analog signal is converted to an 8 bit digital number N having a value between 256 and 512. The 8 bit output of the converter is applied to the input of the divide-by-N counter 104. The counter 104 also receives a clock signal of 20.48 kHz from the clock generator 100. The function of the counter 104 is to divide the clock frequency by N to output a digital signal having a frequency between 40 and 80 Hz. This signal is fed to the squaring flip-flop 106 which divides by 2 and yields a square wave having a 50% duty cycle. Thus the output signal ranges from 20 to 40 Hz and accurately represents the measured parameter. The flip-flop output is directed to an FET 108 which is serially coupled with a resistor 110 between V+ and ground. Thus current will be drawn from V+ in periodic pulses determined by the flip-flop output. By referring to FIG. 2 it can be seen that the current is directly reflected to the transmission pair 12 through the Darlington pair 56. The current signal thus can be monitored at the central station and the period of the pulses is useful to establish the precise value of the measured condition, the system having been calibrated so that the relationship between the period or frequency and the condition is known.

Figure 4:
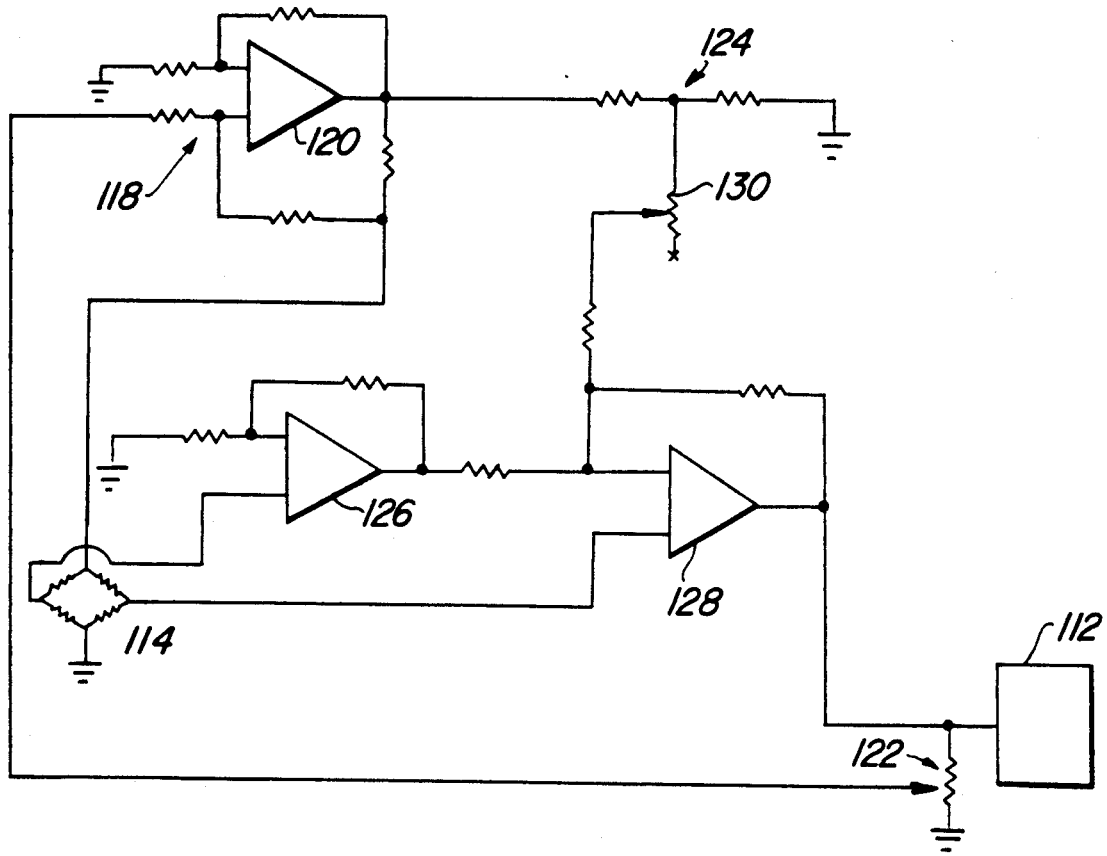
FIG. 4 is a schematic diagram of a sensor circuit for use with the circuit of FIG. 3 according to the invention.

The sensor circuit 38 is shown in FIG. 4. The description is for a pressure sensor but the same circuit applies to other sensor as well. Power is supplied to the sensor circuit as well as to the analog to digital converter 102 from a 2.23 volt reference source 112. A strain gage bridge responsive to pressure or some other transducer 114 is coupled to a signal processing circuit for producing analog voltage output signals on line 116. A current source 118 comprises an op amp 120 with suitable feedback and input resistors to provide a current of nominally 0.5 mA when the voltage reference is connected to an op amp input. Some limited adjustment is allowed by a variable resistor 122 in the line from the voltage source 112 to trim out individual transducer variations. The current from the source 112 is fed to the transducer 114 to bias the strain gage bridge to set the output signal level swing over a given pressure range. The op amp 120 output is coupled to ground through a voltage divider 124. Op amps 126 and 128 are configured as an instrumentation amplifier to accept the differential output of the bridge 114 and produce on line 116 precisely the signal levels needed at the input to the converter 102. For that purpose the op amps 126 and 128 each have their positive input terminal connected to a strain gage output. The op amp 126 output is connected to the negative input of the op amp 128. The same negative input is connected through a variable resistor 130 to the center of the divider 124. The variable resistor is used to trim the "zero" or ambient pressure, since the sensor is an absolute pressure device.

It will thus be seen that the addressable transducer is substantially improved over the prior art in that it provides a unique approach to generating response signals which very accurately embody the information generated by a sensor wherein the signals are particularly well suited to transmission over long distances for maintaining signal integrity even at very low power levels.

What is claimed is:

1. In an addressable transducer, a response circuit for generating a signal corresponding to a measurand, comprising:
   sensing means for producing an analog voltage representing the measurand,
   an analog to digital converter responsive to the analog voltage for generating a digital number having a value representing the measurand
   clock means for providing a fixed frequency, and
   a divider coupled with the clock means and responsive to the digital number for dividing the fixed frequency by the number to yield a resultant frequency corresponding to the value of the measurand.

2. The invention as defined in claim 1 including
   a flip-flop circuit coupled to the divider output to further divide the resultant frequency and produce a square wave output accurately reflecting the measurand value.

3. The invention as defined in claim 1 including;
   a pair of input terminals adapted for coupling with a source of supply current and address signals, and
   means for coupling the divider to the terminals to modulate the current drawn by the transducer.

4. The invention as defined in claim 3 wherein the coupling means includes a flip-flop circuit coupled to the input terminals as a current sink and responsive to the resultant frequency of the divider for producing a square wave output having a frequency accurately reflecting the measurand value.

* * * * *